UNITED STATES PATENT OFFICE.

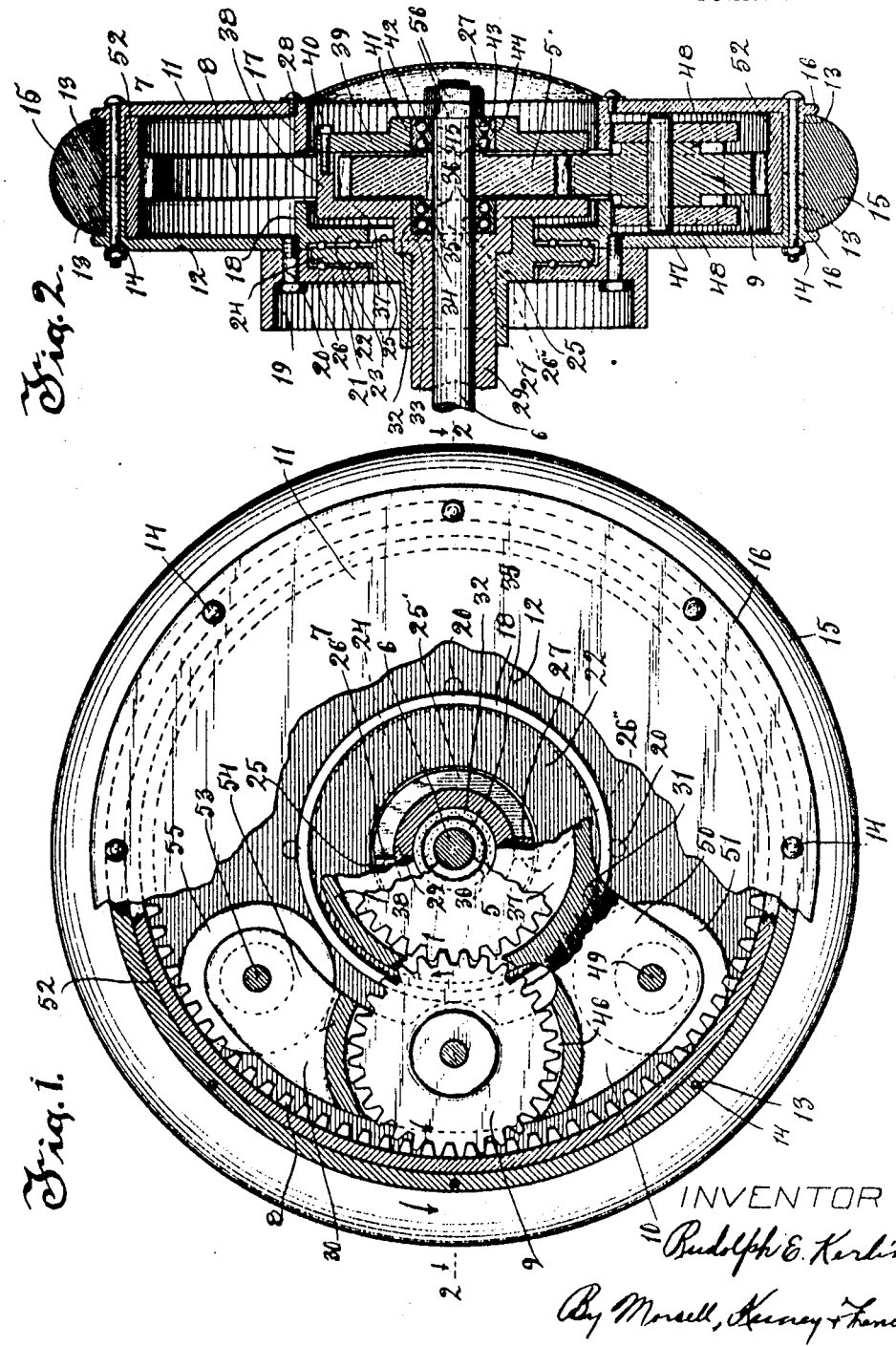

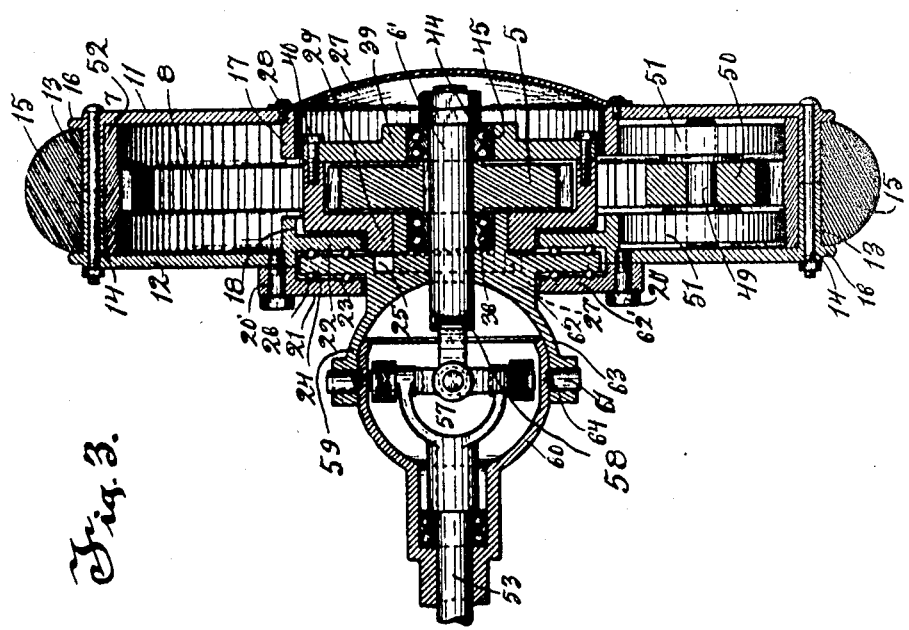

RUDOLPH E. KERLIN, OF CUDAHY, WISCONSIN.

MOTOR-DRIVEN WHEEL.

1,193,560.  Specification of Letters Patent.  Patented Aug. 8, 1916.

Application filed July 6, 1915. Serial No. 38,093.

*To all whom it may concern:*

Be it known that I, RUDOLPH E. KERLIN, a citizen of the United States, and resident of Cudahy, in the county of Milwaukee and State of Wisconsin, have invented new and useful Improvements in Motor-Driven Wheels, of which the following is a description, reference being had to the accompanying drawings, which are a part of this specification.

The invention relates to motor-driven wheels.

The invention is designed more particularly to provide a driving mechanism between the wheels and the front and rear shafts of a four wheel drive truck.

The invention is further designed to provide a driving mechanism which consists of a sun and orbit gear and a planetary gear meshing with said gears which planetary gear is mounted on a frame revolubly mounted on the drive shaft with its weight offset from the center of gravity so that when driving the gear frame will be raised to normal position, but due to its weight will have a tendency to move down and this together with the movability of the gear-carrying frame will provide a more flexible drive than that in which the planetary gear is journaled on a fixed support.

With this and other objects in view the invention consists in the several features hereinafter set forth and more particularly defined by claims at the conclusion hereof.

In the drawings, Figure 1 is a vertical sectional view of the device embodying the invention applied to the rear wheel, parts being shown in section and parts being broken away; Fig. 2 is a section taken on line 2—2 of Fig. 1; Fig. 3 is a vertical section showing it applied to the front wheel of the vehicle.

The driving mechanism for each wheel comprises a sun gear 5 keyed to the drive shaft 6, a wheel 7, an orbit gear 8 secured within said wheel, a planetary gear 9, meshing with the gears 5 and 8, and a movable frame 10 for carrying said planetary gear.

The wheel 7 comprises a pair of oppositely disposed flanged rings 11 and 12 each having annular rim forming flanges 13 adjacent their outer periphery and secured together by bolts 14 passing through apertures in said flanges 13. A rubber tire 15 is secured between the annular projections 16 on the rings 11 and 12. The ring 11 is provided with an inwardly extending annular flange 17 and the ring 12 is provided with an inwardly extending annular flange 18, the inner sides of said flanges forming a guideway for purposes hereinafter described. The usual brake drum is secured by bolts 20 to the ring 12 and an annular portion 21 forms, with the portion 22 of the ring 12, an annular pocket 23 in which the upper portion 24 of the shaft casing 25 is revolubly mounted, thrust roller bearings 26 being interposed between said portion 24 and the portions 21 and 22 of the drum. A covering 27' is secured by bolts 28 to the front side of the ring 11 to form a covering to protect the interior of the wheel from dust and dirt.

The movable frame 10 for carrying the gear 9 comprises a hub portion 29 and an arc-shaped extension 30 concentrically disposed with respect to the wheel and axle but offset from the hub through a neck 31 connected with said portion 29. The hub portion 29 is journaled in the shaft casing 25 and on the shaft 6 and is provided with a bushing 32 provided with grooves 33 oppositely disposed with respect to grooves 34 in a bushing 35 on the shaft, said grooves 33 and 34 forming pockets for roller bearings 36. The front end 37 of the hub portion is provided with an annular flange 38 and a ring 39 is secured by bolts 40 to said flange, said ring having a bushing 41 provided with grooves 42 oppositely disposed with respect to the grooves 43 in a bushing 44 on the shaft 6, said grooves 42 and 43 forming pockets for roller bearings 45. Thus the shaft 6 is free to turn within the hub portion 29. The neck portion 31 of the frame is disposed in the opening between the flanges 18 and 17 on the flanged rings. The rollers 55 and 51 disposed between the flanges 17 and 18 and the run 52 serve to space the wheel 7 from the hub and, through the hub 29, neck 31 and extension 30 of the movable frame 10, to support the wheel 7 in position, the rollers permitting the wheel to revolve about the shaft casing 25.

The intermediate portion of the arc-shaped extension 30 is recessed to form a gear receiving pocket 46 and a pin 47 carrying the gear 9 is journaled in the sides 48 of the extension adjacent said pocket. A pin 49 is journaled in the end 50 of the extension and carries rollers 51 on either side thereof which are rotatably mounted in the guideways formed between the flange 17 and the flange portion 52 of the orbit gear 8 and the flange 18 and the portion 52 respectively. A pin 53 is journaled in the other end 54 of the extension and carries rollers 55 on either side thereof which are rotatably mounted in the guideways above described, Fig. 2. Nuts 56 on the end of the shaft 6 secure the parts mounted thereon against endwise movement. The end of the shaft casing 25 is provided with a groove 25' forming stops 26' and 26'' which are in the path of a projection 27 on the hub portion of the gear carrying member to limit the movement of said member when the wheel is moving forward or backward.

In Fig. 3 I have shown a driving mechanism which is similar in all respects to that previously described except that it is adapted for use on the front wheel of a vehicle and the shaft 6' is provided with a universal joint connection between it and the front axle 53'. Thus the front shaft 6' is provided with a universal joint connection 57, the inner end 58 of the shaft being journaled in a casing 59 which is enlarged into a substantially semicircular hood 60 adjacent the connection 57 and is provided with diametrically vertically disposed pins 61 and a shaft casing member 62 is similar to the casing 25 except that its rear portion is enlarged into a substantially semicircular hood 63 which is provided with apertures 64 for receiving the pins 61. Instead of the brake hub 19 a ring plate 62' is secured to the ring 12 by bolts 20' and the hub portion 29' of the gear carrying frame is journaled on the shaft casing instead of the shaft casing on it, as in Fig. 2. The shaft 6' is free to turn within the shaft casing 62 and the plate 39 of the hub portion 29. The remaining construction is the same as that previously described.

The operation of the device in either instance is as follows:—The rotation of the shaft 6 or 6' causes the gear 5 to rotate and consequently the gear 9, which transmits rotary motion to the orbit gear 8 and consequently the wheel 7. When the gear 5 is moving in the direction of the arrow the gear 9, being in mesh therewith, will carry the frame 10 to its extreme upper position until the projection 27' strikes the stop 26''. Under these conditions, due to the floating connection of the frame 10 through the rollers 51 and 52 and the shaft 6 or 6' there will be a constant tendency for the gear-frame to move down carrying the gear 9 with it and this will produce a flexibility of drive which could not be obtained were the gear 9 fixedly mounted with respect to the gears 5 and 8. If the rotation of the shaft 6 or 6' is reversed the gear-carrying frame 10 will be moved onto the other side of the wheel and exert the same tendency to drive the wheel rearwardly.

The invention thus exemplifies a driving connection between the shaft and the wheel of a vehicle in which a planetary gear mounted on a swinging frame meshes with a sun gear on the shaft and an orbit gear of the wheel and thus transmits power from the shaft to said wheel, the movement of the gear carrying frame producing a flexible drive and the weight of the gear frame also assisting in starting the drive of the vehicle.

The invention is not to be restricted to the details of construction herein set forth, but may be varied so as to be within the scope of the appended claims.

What I claim as my invention is:—

1. The combination, with the drive-shaft of a vehicle and the wheel thereof, of a driving mechanism for said wheel comprising an orbit gear carried by the wheel, a sun gear carried by the shaft, a planetary gear meshing with said sun and orbit gears, and a frame swingingly mounted for limited movement upon the shaft for carrying said planetary gear to provide a flexible drive.

2. The combination, with the driven-axle of a vehicle, of a sun gear carried by said axle, an annular wheel mounted concentrically about said axle, an orbit gear mounted on said wheel, a planetary gear meshing with sun and orbit gears, a frame for carrying said planetary gear swingingly mounted about the axle and carrying rollers, a guideway formed in said wheel for said rollers, and means for limiting the swinging movement of the frame.

3. The combination, with a driven axle of a vehicle, of a gear carried by said axle, a wheel comprising an annular member having annular guideways therein, an internal gear carried by said wheel adjacent said guideways, a gear-carrying frame swingingly mounted for limited movement about the axle and provided with a concentrically disposed arc-shaped extension, rollers on said extension rotatably mounted in said annular guideways, and a gearing connection between said gears carried by said frame to form a flexible drive for said gears.

4. The combination, with the driven axle of a vehicle, of a sun gear carried by said axle, a gear carrying frame journaled on said axle on opposite sides of said sun gear and having limited movement about the axle, a shaft casing in which a part of said gear-carrying frame is journaled, an annular wheel mounted concentrically about said axle, gear frame and shaft casing and provided with an orbit gear, thrust bearings between said annular wheel and said shaft casing, annular guideways in said wheel, rollers mounted in the gear frame and running in said guideways to permit movement of said gear frame with respect to said wheel and axle, and a planetary gear carried by said frame and meshing with said sun and orbit gears.

In testimony whereof, I affix my signature, in presence of two witnesses.

RUDOLPH E. KERLIN.

Copies of this patent may be obtained for five cents each, by addressing the "Commissioner of Patents, Washington, D. C."